United States Patent

Christensen et al.

[11] Patent Number: 5,989,154
[45] Date of Patent: Nov. 23, 1999

[54] APPARATUS FOR LIMITING THE TORQUE ON A POWER TRAIN AND METHOD OF OPERATING SAME

[75] Inventors: Steven V. Christensen, Peoria; Dale A. Dalton, Metamora; Joshua Zulu, Chillicothe, all of Ill.

[73] Assignee: Caterpillar Inc., Peoria, Ill.

[21] Appl. No.: 08/909,047

[22] Filed: Aug. 11, 1997

[51] Int. Cl.$^6$ .................................................. B60K 41/08
[52] U.S. Cl. ............................................................ 477/111
[58] Field of Search ................................ 477/111, 61, 54

[56] References Cited

U.S. PATENT DOCUMENTS 5,457,633 10/1995 Palmer et al. ...................... 364/431.09
5,525,043 6/1996 Lukich ..................................... 417/218

Primary Examiner—Dirk Wright
Attorney, Agent, or Firm—David M. Masterson

[57] ABSTRACT

An apparatus for controlling the torque on a power train of a machine is disclosed. The power train includes an engine, a transmission, and a torque converter for transmitting torque between the engine and transmission. A torque converter speed sensor produces a torque converter speed signal and an engine speed sensor produces an engine speed signal. A gear selector device produces a gear select signal indicating a desired gear ratio. A look-up table stores an upper engine power curve and a lower engine power curve. Finally, an electronic controller receives the torque converter, engine speed and gear select signals, and selects one of the upper and lower engine power curves to operate the engine in response to the selected gear ratio and torque converter speed.

12 Claims, 3 Drawing Sheets

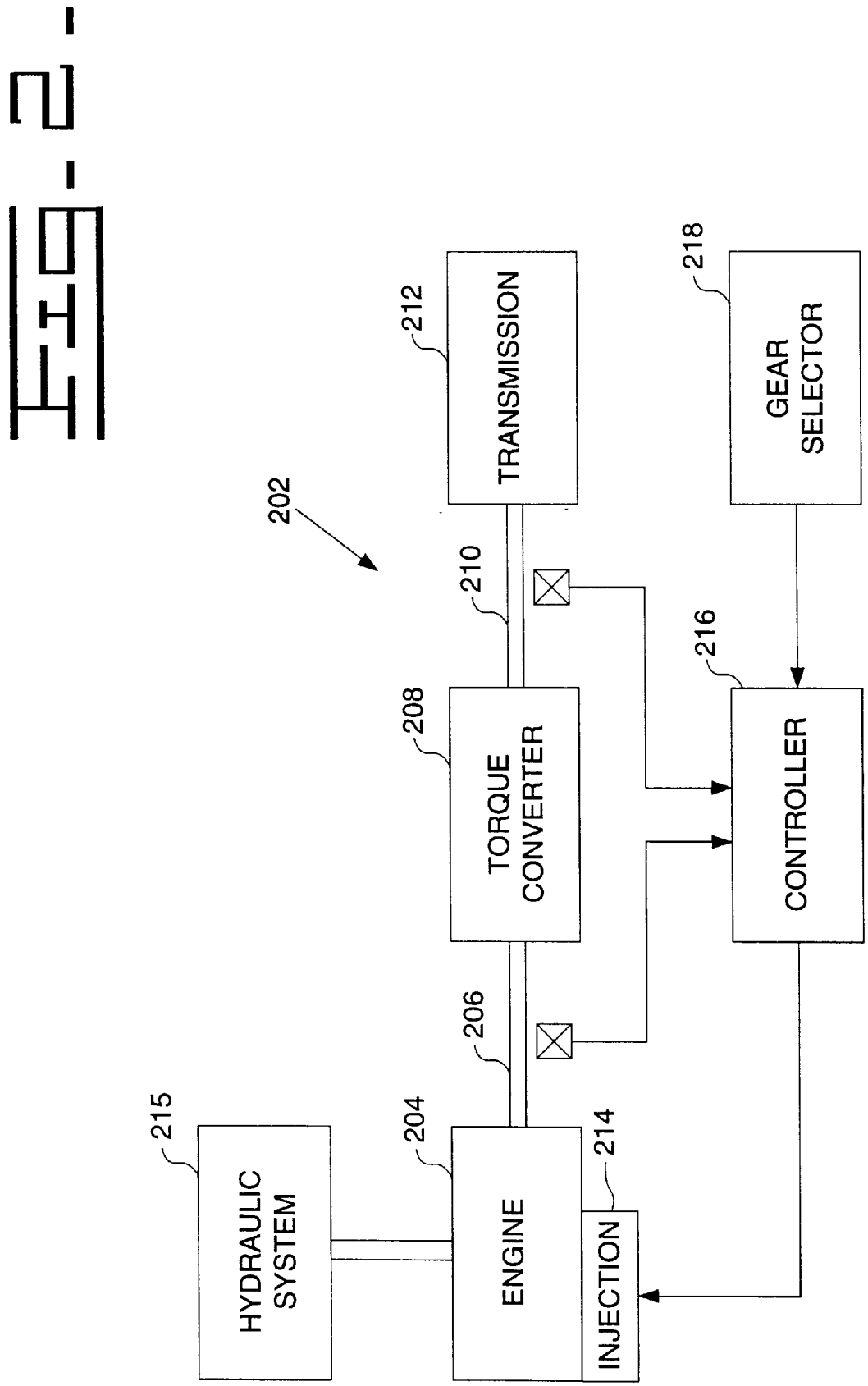

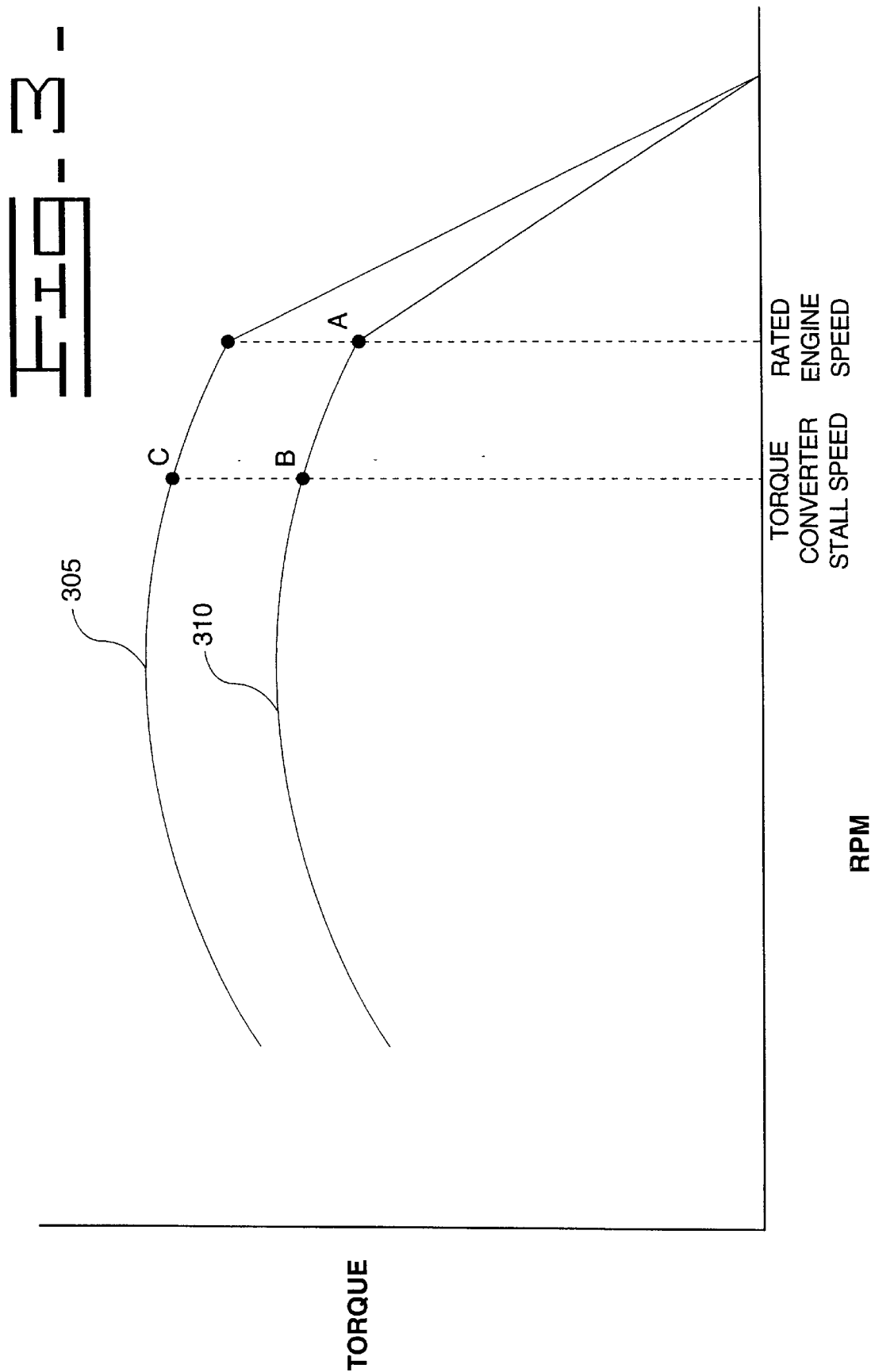

APPARATUS FOR LIMITING THE TORQUE ON A POWER TRAIN AND METHOD OF OPERATING SAME

TECHNICAL FIELD

This invention relates generally to an apparatus for limiting the torque on a power train and, more particularly, to a controller that selects one of two power curves to operate an engine in response to a selected gear ratio and speed of a torque converter.

BACKGROUND ART

In heavy equipment and other machinery having an engine, torque converter, transmission, driveline, axles and an earth moving implement, it is important to match the power output of the engine with the torque capability of the powertrain components. For example, if the engine produces power above the rating of the powertrain components, then the powertrain components may deteriorate and fail sooner than expected. However, selecting powertrain components with a power rating that exceeds the power output of the engine and torque converter increases the cost of the powertrain components. Thus, it is advantageous to match the power output of the engine and torque converter closely to the torque ratings of the powertrain components.

As is known in the art, the maximum torque output of the torque converter varies with engine speed and with output speed of the torque converter. The torque produced within the transmission and other powertrain components is a function of the engine speed, torque converter output speed and transmission gear ratio. Ideally, the transmission should be selected so that its components can accept the maximum torque output of the torque converter. However, the maximum torque output may occur over a narrow band of engine output speeds or in a specific gear ratio. At other speeds or in other gear ratios, the torque capacity on the transmission components may be greater. For those speeds and gear ratios it would be possible to select less expensive components. Thus, for some applications, it may be preferable to limit the amount of power the engine can produce during certain gear selections and speeds in order to reduce the maximum torque on the transmission and powertrain components. This, in turn, will permit the use of less expensive transmission components.

Prior art controllers are known which limit the engine power output based on gear selection of the transmission. Such controllers may perform satisfactorily on machines and other equipment without other systems requiring engine power. For example, on wheel loaders and other equipment with earth moving implements, the implement is typically powered by a hydraulic system that is powered by the engine. In those cases, the power produced by the engine may be demanded by the hydraulic system and not the transmission. Thus, there may be instances when full engine power might damage the transmission components if all of the power is applied to the transmission. However, if the engine power is, at least in part, being diverted to the hydraulic system, then full engine power might be appropriate. Prior art controllers that limit engine power, do not consider hydraulic system power requirements.

One solution might be to include a pressure transducer or other device to sense the power demands of the hydraulic system. However, those sensors are expensive. It would be preferable to have a system that can account for hydraulic system demand using sensors already present on the machine and reduce engine power when excessive torque levels might result.

The present invention is directed toward overcoming one or more of the problems discussed above.

DISCLOSURE OF THE INVENTION

In one aspect of the present invention, an apparatus for controlling the torque on a power train of a machine is disclosed. The power train includes an engine, a transmission, and a torque converter for transmitting torque between the engine and transmission. A torque converter speed sensor produces a torque converter speed signal and an engine speed sensor produces an engine speed signal. A gear selector device produces a gear select signal indicating a desired gear ratio. A look-up table stores an upper engine power curve and a lower engine power curve. Finally, an electronic controller receives the torque converter, engine speed and gear select signals, and selects one of the upper and lower engine power curves to operate the engine in response to the selected gear ratio and torque converter speed.

BRIEF DESCRIPTION OF THE DRAWINGS

For a better understanding of the present invention, reference may be made to the accompanying drawings in which:

FIG. 2 illustrates a block diagram of a power train of the wheel loader; and

FIG. 3 illustrates a graph showing a pair of engine power curves.

BEST MODE FOR CARRYING OUT THE INVENTION

Figure 1:
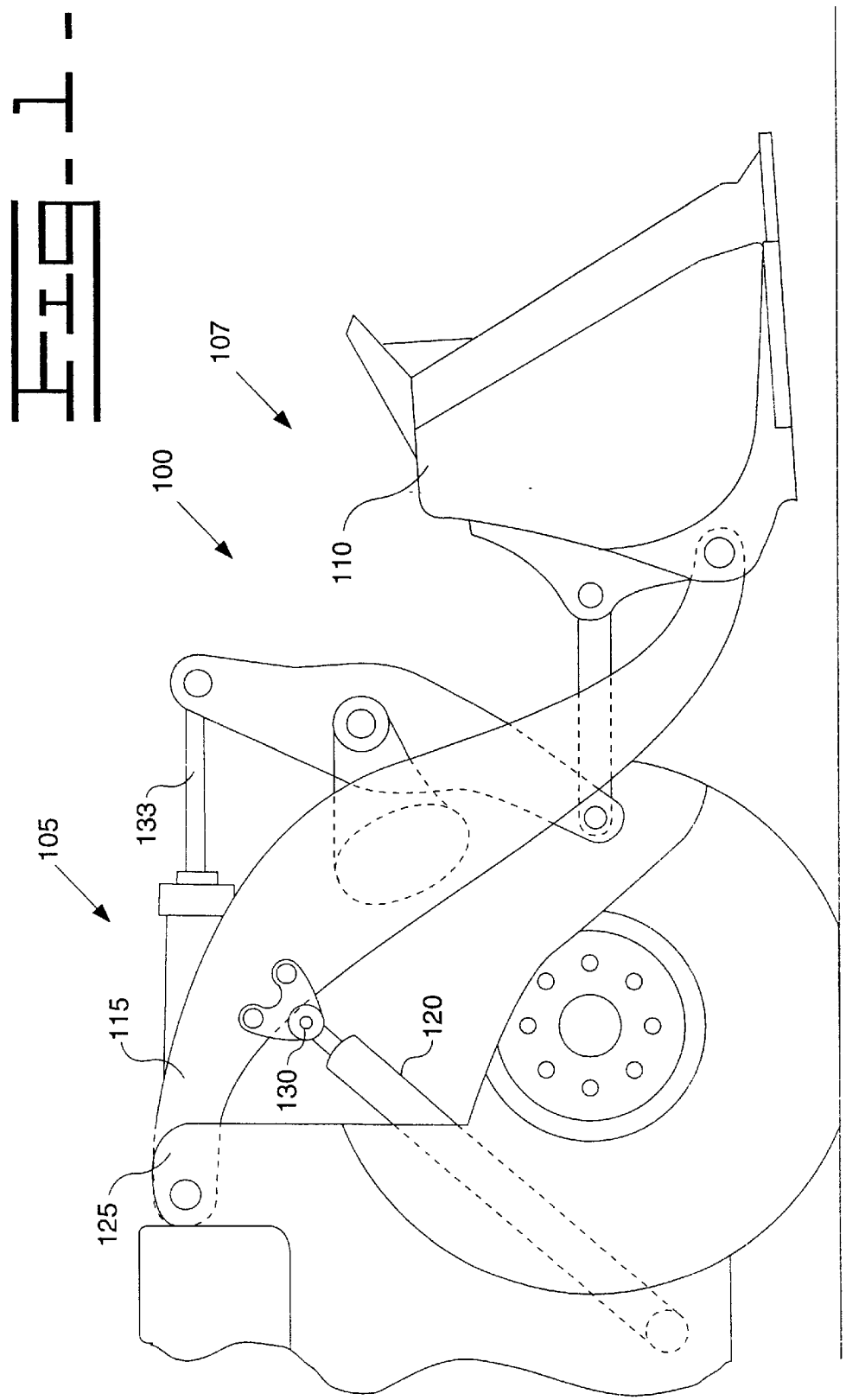
FIG. 1 illustrates a forward portion of a wheel loader.

The present invention is directed toward controlling the power train torque on an earth working machine 100, such as a wheel loader 105 shown in FIG. 1. Although a wheel loader is shown, it is noted that the present invention is equally applicable to machines such as track type loaders, integrated tool carriers, and other type of earth working machines. In FIG. 1, a forward portion of a wheel-type loader 105 having a work implement 107 is illustrated. Note that the illustrated work implement assembly is just one example of a work implement assembly for a wheel loader. The work implement 107 includes a bucket 110 that is connected to a lift arm assembly or linkage 115 that is pivotally actuated by two hydraulic lift cylinders 120 (only one of which is shown) about a pair of lift arm pivot pins 125 (only one shown) attached to the machine frame. A pair of lift arm load bearing pivot pins 130 (only one shown) are attached to the lift arm assembly and the lift cylinders. The bucket is also tilted or racked by a bucket tilt cylinder 133 about a pair of bucket pivot pins 135 (only one shown).

A power train 202 for the machine is illustrated in FIG. 2. The power train 202 includes an engine 204 having a shaft 206 connected to a hydrodynamic torque converter 208. For example, the engine 204 may include a plurality of solenoid operated fuel injectors (not shown) that are used to control the amount of fuel delivered to the engine. A fuel injection control 214 of a type well known in the art is used to control the amount of fuel dispensed by the fuel injectors. The torque converter 208 is rotatably connected to a centrally located output shaft 210 that provides the input to a multi-speed transmission 212 that is used to drive the wheels of the wheel loader. Not only does the engine 204 provide the muscle for the power train 202, but the engine additionally provides the muscle for the wheel loader's hydraulic system, represented by block 215. As is well known, the hydraulic system 215 includes the appropriate number of hydraulic pumps, motors and valves to supply pressurized fluid to the various hydraulic cylinders.

An electronic controller 216 is provided to control the operation of the power train 202. Preferably, the electronic controller 216 is implemented in a microprocessor based architecture. It is noted that the term microprocessor is meant to include microcomputers, microprocessors, integrated circuits and the like capable of being programmed. The electronic controller 216 contains sufficient electronic circuitry to convert input signals from a plurality of sensors, make several computations based on the input signals, and generate a fuel delivery signal to the fuel injection control 214. The fuel delivery signal regulates the amount of fuel injected into the engine and the fuel injection timing to produce a desired power output of the engine 204 in a manner well known in the art. Preferably, the microprocessor is programmed with a plurality of preselected logic rules for producing one or more output signals in response to receiving one or more input signals.

The electronic controller receives an engine speed signal produced by an engine speed sensor 218 that is responsive to the rotational speed of the engine and a torque converter speed signal that is responsive to the rotational speed and direction of the torque converter output shaft 210. The electronic controller 216 also receives a gear select signal produced by a gear selector device 218 which is positionable at a plurality of positions. The gear select signal indicates a desired gear ratio and/or direction of the machine, and is responsive to position of the gear select device. As is known in the art, the gear selector device 218 is generally connected either mechanically or electrically to the transmission 212 to cause the transmission to engage the selected gear ratio.

Thus, while the present invention has been particularly shown and described with reference to the preferred embodiment above, it will be understood by those skilled in the art that various additional embodiments may be contemplated without departing from the spirit and scope of the present invention.

Industrial Applicability

The present invention is directed toward preventing excessive torque levels from damaging power train components, while at the same time permitting the engine to produce maximum power for hydraulic system operation. For example, the present invention reduces the excessive torque levels in the drive train by reducing engine power.

Reference is now made to FIG. 3, which shows an upper power curve 305 and a lower power curve 310 of the engine 204 based on engine torque and engine RPM. The upper power curve 305 represents the full rated power range of the engine 204. The lower power curve 310 represents a predetermined power range of the engine that is lower than the full rated power. Preferably, the engine curves 305,310 are stored in a look-up table in the memory of the controller 216. Typically, the wheel loader operates with the engine 204 running at full rated power in accordance the upper power curve 305. For example, the controller 216 determines the current transmission gear ratio, selects the upper power curve 305 and produces the fuel delivery signal to control the fuel injection to allow the engine 204 to run at full rated power. The controller 216 selects the upper power curve 305 when the selected gear ratio is other than a first gear ratio. Typically, the torque levels imposed on the power train 202 under these conditions are nominal.

However, the torque levels imposed on the power train 202 are high when the wheel loader is pushing the bucket into a pile of dirt. In this situation, the wheel loader will be operating in first gear with the torque converter output speed being non-zero. Advantageously, the present invention limits the torque levels on the power train 202 by limiting the power of the engine 204 by running the engine 204 in accordance with the lower power curve 310, which effectively limits the amount of fuel injected into the engine 204 and/or modifies the fuel injection timing. For example, the controller 216 determines the output speed of the torque converter 208, selects the lower power curve 310, and produces a fuel delivery signal to limit the engine power to a lower power range governed by the lower power curve 310. The controller 216 selects the lower power curve 310 when the selected gear ratio is a first gear ratio and the torque converter speed is non-zero. In this situation, the engine 204 will run in a power range along the lower power curve 310 between points "A" and "B".

Once the bucket has engaged the pile, the wheel loader will have stopped moving, the torque converter output speed will have dropped to zero representing a stalled condition, and the hydraulic system 215 will demand power to capture material in the bucket. In order to provide the necessary "break-out" force to lift the bucket from the pile of material, it is desirable to allow the engine 204 to operate at the engine's full rated power so that the hydraulic system 215 can operate at the demanded power levels. Advantageously, the controller 216 increases the engine power by running the engine along the upper power curve 305. For example, the controller 216 determines the output speed of the torque converter 208 and makes a transition from the lower power curve 310 to the upper power curve along points "B" and "C" when the torque converter output speed is substantially zero. Thus, the engine 204 can operate at full rated power to allow the hydraulic system 215 have all available energy to lift the bucket from the pile.

Other aspects, objects and advantages of the present invention can be obtained from a study of the drawings, the disclosure and the appended claims.

We claim:

1. An apparatus for controlling the torque on the power train of a machine, the power train including an engine, a transmission, and a torque converter for transmitting torque between the engine and transmission, comprising:

a torque converter speed sensor senses the output speed of the torque converter and responsively produces a torque converter speed signal;

an engine speed sensor senses the speed of the engine and responsively produces an engine speed signal;

a gear selector device positionable at a plurality of positions indicates a desired gear ratio and produces a gear select signal in response to being positioned at one of the plurality of positions;

a look-up table stores an upper engine power curve and a lower engine power curve; and an electronic controller receives the torque converter, engine speed and gear select signals, and selects one of the upper and lower engine power curves to operate the engine in response to the selected gear ratio and torque converter speed.

2. An apparatus, as set forth in claim 1, wherein the controller selects the upper power curve in response to the selected gear ratio being other than a first gear ratio.

3. An apparatus, as set forth in claim 2, wherein the controller selects the lower power curve in response to the selected gear ratio being a gear ratio first gear ratio and the torque converter speed being non-zero.

4. An apparatus, as set forth in claim 3, wherein the controller transitions to the upper power curve from the lower power curve in response to the torque converter output speed being substantially zero.

5. A method for controlling the torque on the power train of a machine, the power train including an engine, a transmission, and a torque converter for transmitting torque between the engine and transmission, comprising the steps of:

sensing the output speed of the torque converter and responsively producing a torque converter speed signal;

sensing the speed of the engine and responsively producing an engine speed signal;

producing a gear select signal indicating a desired gear ratio of the transmission;

storing an upper engine power curve and a lower engine power curve; and receiving the torque converter, engine speed and gear select signals, selecting one of the upper and lower engine power curves, and producing a fuel delivery signal to control the fuel injected into the engine to operate the engine at the selected power range in response to the selected gear ratio and torque converter speed.

6. A method, as set forth in claim 5, including the step of operating the engine at full rated power in accordance with the upper power curve in response to the selected gear ratio being a gear ratio other than a first gear ratio.

7. A method, as set forth in claim 6, including the step of limiting the engine power in accordance with the lower power curve in response to the selected gear ratio being a first gear ratio and the torque converter speed being non-zero.

8. A method, as set forth in claim 7, including the step of increasing the engine power in accordance with the upper power curve in response to the torque converter output speed being substantially zero.

9. A method for controlling the torque on the power train of a machine, the power train including an engine, a transmission, and a torque converter for transmitting torque between the engine and transmission, comprising the steps of:

sensing the output speed of the torque converter and responsively producing a torque converter speed signal;

sensing the speed of the engine and responsively producing an engine speed signal;

producing a gear select signal indicating a desired gear ratio of the transmission;

storing an upper engine power curve and a lower engine power curve; and receiving the torque converter, engine speed and gear select signals, and selecting one of the upper and lower engine power curves to operate the engine in response to the selected gear ratio and torque converter speed.

10. A method, as set forth in claim 9, including the step of selecting the upper engine power curve in response to the selected gear ratio being a gear ratio other than a first gear ratio.

11. A method, as set forth in claim 10, including the step of selecting the lower power curve in response to the selected gear ratio being a first gear ratio and the torque converter speed being non-zero.

12. A method, as set forth in claim 11, including the step of transitioning from the lower engine power curve to the upper engine power curve in response to the torque converter output speed being substantially zero.

* * * * *